(12) United States Patent
Ohtsuka et al.

(10) Patent No.: US 7,626,483 B2
(45) Date of Patent: Dec. 1, 2009

(54) SELF-RECOVERING CURRENT LIMITING FUSE USING DIELECTROPHORETIC FORCE

(75) Inventors: Shinya Ohtsuka, Kitakyushu (JP); Masayuki Hikita, Kitakyushu (JP)

(73) Assignee: Kyushu Institute of Technology, Fukuoka (JP)

( * ) Notice: Subject to any disclaimer, the term of this patent is extended or adjusted under 35 U.S.C. 154(b) by 212 days.

(21) Appl. No.: 11/596,746

(22) PCT Filed: Aug. 10, 2005

(86) PCT No.: PCT/JP2005/014628
§ 371 (c)(1),
(2), (4) Date: Nov. 16, 2006

(87) PCT Pub. No.: WO2006/025199
PCT Pub. Date: Mar. 9, 2006

(65) Prior Publication Data
US 2007/0241856 A1  Oct. 18, 2007

(30) Foreign Application Priority Data
Aug. 30, 2004  (JP) .............................. 2004-249481

(51) Int. Cl.
*H01H 85/00* (2006.01)
*H01H 85/04* (2006.01)
*H01H 69/02* (2006.01)

(52) U.S. Cl. ...................... 337/167; 337/114; 337/142; 337/159; 29/623

(58) Field of Classification Search ................. 337/167, 337/159, 114, 142; 29/623
See application file for complete search history.

(56) References Cited

U.S. PATENT DOCUMENTS 3,838,373 A * 9/1974 Inoue et al. .................... 337/21
5,471,185 A * 11/1995 Shea et al. .................... 335/51

(Continued)

FOREIGN PATENT DOCUMENTS

JP          6-199301          7/1994

(Continued)

*Primary Examiner*—Jayprakash N Gandhi
*Assistant Examiner*—Bradley H Thomas
(74) *Attorney, Agent, or Firm*—Browdy and Neimark, P.L.L.C.

(57) ABSTRACT

A self-recovering current limiting fuse protecting a secondary battery having a high rated voltage thanks to its improved breakdown voltage, expanding the application range, shortening the charging time, and realizing maintenance-free. The self-recovering current limiting fuse is made by fluid-dispersing solid conductive particles into a liquid matrix between electrodes. A current limiting operation through evaporation/spreading of the solid conductive particles and a conducting state brought about through collection of the solid conductive particles between the electrodes by dielectrophoretic force of the solid conductive particles are realized repeatedly, and a current limiting operation through evaporation/spreading of the solid conductive particles by overcurrent is realized.

4 Claims, 6 Drawing Sheets

U.S. PATENT DOCUMENTS

| | | | |
|---|---|---|---|
| 5,581,192 A * | 12/1996 | Shea et al. | 324/722 |
| 5,691,689 A * | 11/1997 | Smith et al. | 338/22 R |
| 5,796,569 A * | 8/1998 | Gronowicz, Jr. | 361/106 |
| 5,907,272 A * | 5/1999 | McGuire | 338/22 R |
| 6,362,722 B1 * | 3/2002 | Cole et al. | 338/22 R |
| 6,489,879 B1 * | 12/2002 | Singh et al. | 337/167 |
| 6,525,642 B1 * | 2/2003 | Kremers et al. | 338/80 |
| 6,600,405 B1 * | 7/2003 | Kremers et al. | 337/21 |
| 6,603,384 B1 * | 8/2003 | Kremers et al. | 337/21 |
| 6,621,401 B1 * | 9/2003 | Kremers et al. | 337/21 |
| 6,898,071 B2 * | 5/2005 | Kirsten | 361/307 |
| 2003/0048619 A1 | 3/2003 | Kaler et al. | |

FOREIGN PATENT DOCUMENTS

| | | |
|---|---|---|
| JP | 9-326302 | 12/1997 |
| JP | 10-326554 | 12/1998 |
| JP | 2000-331592 | 11/2000 |
| JP | 2002-75329 | 3/2002 |
| JP | 2002-270078 | 9/2002 |
| JP | 2003-000223 | 1/2003 |
| JP | 2003-200081 | 7/2003 |
| JP | 2003-317602 | 11/2003 |

* cited by examiner

Forces acting on a particle

FDEP: dielectrophoretic force (composed of horizontal component "r" and vertical component "z"), Fg: Gravity, Fv: viscosity, Fb: buoyancy, Ff: frictional force

(a) "off" state (before application of electric potential)

(b) "on" state (after application of electric potential)

FIG. 6

(a) "off" state (before application of electric potential)

(b) "on" state (after application of electric potential)

SELF-RECOVERING CURRENT LIMITING FUSE USING DIELECTROPHORETIC FORCE

FIELD OF THE INVENTION

The present invention relates generally to a self-recovering current limiting fuse and more particularly to a self-recovering current limiting fuse that switches from one to another of a blocking or restricting state and a conducting state by virtue of a dielectrophoresis caused under the application of electric potential on conductive solid particles suspended in a liquid matrix.

BACKGROUND AND REVIEW OF RELATED TECHNOLOGY

Recent electronic gadgets including cell phones, lap-top personal computers and so on, have, as is well known, protective means for secondary batteries. The protective means are commonly made of an electric resistor element having a positive temperature coefficient (PTC) of resistance. It is desirable that advanced electronic gadgets of the class described earlier perform better in operation, last longer in service life, and exhibit further efficient performance. To cope with the functional demands as stated above, it is desirable that the secondary batteries have higher capacity as well as electric intensity. Correspondingly, it is desirable that the PTC element be able to withstand high electric potential. The current working PTC elements are expected to withstand about 8 volts. To deal with batteries able to withstand much higher electric potential, nonetheless, the PTC element has to have an improved insulation strength, or withstand voltage, especially in the "off" state where the current is limited extremely less. With leading conventional PTC elements, moreover, their matrices are mainly made of solid material including ceramics, polymers, and so on. Most existing PTC elements use either polyethylene composed of polyethylene and carbon black or barium titanate.

Meanwhile, there have been known dielectrophoretic filtering means and methods of dielectrophoretic removal of fine particles from suspension systems. These prior techniques are of practical use to remove effectively as well as selectively fine particles from the suspensions with causing no clogging to recover them with ease. One of the prior dielectrophoretic filtering means is disclosed in, for example patent document 1 enumerated later, in which many dielectric particles are filled between opposing electrodes to cause either local concentration or local reduction in an electric field created across the electrodes, and further there is provided an electric power source to apply across the electrodes an alternating voltage whose frequency is enough to induce dielectrophoretic migration on the dispersed fine particles. Any dielectric particles come into contact or closer encounter with other dielectric particles at sideward locations where the electric field gets the most or the least around the dielectric particles, and then the fine particles in suspensions are collected and captured under dielectrophoretic force into specific sections distinctive in electric field generated near the sideward locations.

Moreover, the patent document 2 listed later discloses an electrode chip available for a microbiological analyzer that makes easily and rapidly a high-sensitive quantitative separation of any specific microorganism in a mixture suspension without drawing upon to the experts. There is provided a reservoir storing antibody fluids therein to feed the antibody fluids into an analyzer chamber where the antibody fluids encounter microorganisms concentrated between the electrodes, making antigen-and-antibody reaction. A processor controller actuates an electric power source to apply an electric potential across the electrodes to concentrate many groups of microorganisms. Of the groups of concentrated microorganisms, just specific group of microorganisms selectively or distinctively reacts with the antibody fluids delivered from the antibody fluids reservoir, thereby getting condensates to be separated from other groups of microorganisms. Analytic means identifies a number of the specific microorganisms, depending on measured variations in conductance between the electrodes.

A current-limiter having a PTC element is conventionally known in which the PTC element is made to get rising in temperature simultaneously through the entire PTC element. Disclosed in, for example the patent document 3 listed later is the PTC current-limiter in which the PTC element is flanked by electrodes that are secured to the opposite sides of the PTC element, one to each side. The PTC element has a raised middle portion and a peripheral portion less in thickness around the raised middle portion. Correspondingly, one of the electrodes is made recessed at a central area with leaving a circular periphery to fit over the raised middle portion of the PTC element. With the construction stated earlier, the PTC element gets large in resistivity at the raised middle portion than at the peripheral portion, so that the temperature rise can be kept uniform through the overall PTC element despite of large radiation rate at the peripheral potion.

The current limiting fuse is conventionally provided by a production process as disclosed in, for example the patent document 4 listed later. Electrodes are secured to forward and aft ends of an insulating tube in a coaxial relation with one another and thereafter an insulating core wound with a fusing element is introduced in the insulating tube through an opening made in an outward end surface of any one of the forward and aft electrodes. After fastening one end of the insulating core wound with a fusing element to any one of the electrodes, the insulating tube is packed with an arc-extinguishing medium. Then, the insulating core is secured at another end thereof to an electrode covering, which is connected to the other electrode. Thus, the insulating core becomes ready for fastening when the electrodes have been once fastened to the insulating tube.

The patent documents 1 to 4 stated earlier refer to the following material information.

Patent document 1: Japanese Patent Laid-Open No. 2003-200081

Patent document 2: Japanese Patent Laid-Open No. 2003-223

Patent document 3: Japanese Patent Laid-Open No. H10-326554

Patent document 4: Japanese Patent Laid-Open No. 2002-270078

DISCLOSURE OF THE INVENTION

Technical Problems to be Solved

The prior PTC element, nonetheless, has a major shortcoming of worse insulation in its "off" state to cause a slight leakage of current or a partial discharge, thereby promoting the material deterioration to get the switching behavior worsened. That is, the prior PTC element is more resistant to the switching operation into the conducting "on" state, thereby increasing the power lost. Occurrence of partial discharge in the PTC element would give rise to the likelihood of posing the issues including EMC, noise, and so on to the switching system. The prior PTC element in basic aspect, moreover, harbors a constructional issue in which conducting fillers are embedded in the solid matrix. The switching behavior into the "off" state in the prior PTC element is commonly carried out by the expansion of a matrix to cut off a conductive path of conducting fillers. Nonetheless, the solid matrix when viewed in structural aspect, in principal, is vulnerable to occurrence of cracks and voids upon expansion. In the cracks and voids, there exists a gaseous phase capsulated with the solid matrix high in dielectric constant. Thus, the electric field focuses on the cracks and voids so as to generate easily any electric discharge there. The PTC element using solid matrix could not get rid of a physical phenomenon in which aerial discharge occurring for the reason as stated earlier was responsible for causing material deterioration in the solid matrix to get the switching behavior worse. The current possibility of this happening makes it tougher for some structures of the PTC element to produce high-tension elements usable above 8V with no failure concern.

Figure 9:
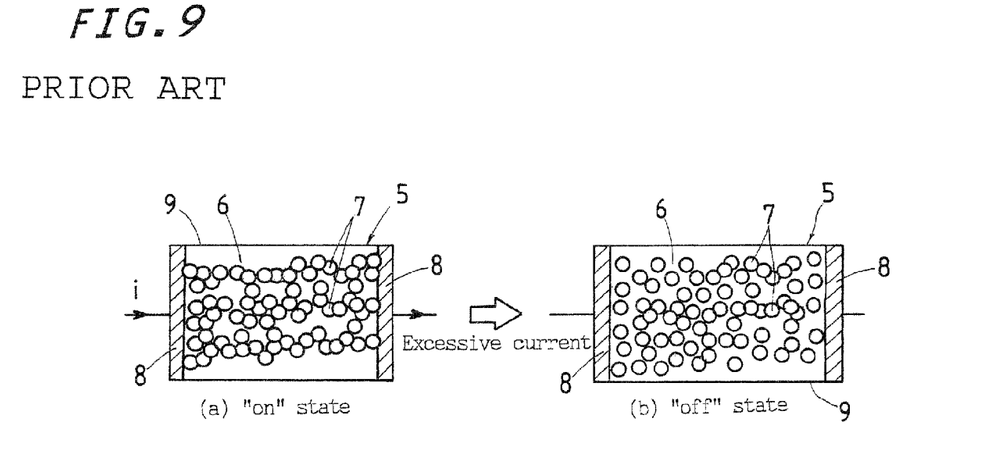
FIG. 9 is a schematic view to illustrate basic principles of operation of a prior self-recovering current limiting fuse.

Meanwhile, FIG. 9 provides a schematic view illustrating a basic principal of operation in a conventional PTC element 5. Expansion of a solid matrix in the PTC element 5 causes an "off" state to give rise to any crack and partial discharge, thereby getting a switching behavior worse to increase an "on" resistance, raising power loss in the conducting condition. The PTC element 5 is composed of a solid matrix 6 of solid insulating material including ceramics, polymers and so on, and fillers of conducting particles 7 mixed in the solid matrix 6. The fillers normally come into contact with one another to make a conductive path bridging a gap between opposing electrodes 8, thereby keeping a conducting "on" condition as shown in FIG. 9(a). In contrast, when the PTC element 5 becomes higher in temperature by the application of an excessive current to the PTC element 5, either the fillers 7 evaporate or the solid matrix expands, depending on selection of material, to get the conductive path broken as shown in FIG. 9(b), thereby setting off a rapid rise of resistance to bring the PTC element into the current limiting or blocking "off" condition. Thus, it remains a major challenge to the PTC element to ensure the repeated implementation of basic operation of switching from the high-current on state to the low-current off state, or vice versa as stated earlier. The PTC element is further needed to have a high-voltage characteristic that is capable of withstanding a circuit voltage applied to the PTC element in its current limiting "off" state.

Currently, the PTC elements low in high tension or voltage withstanding property are widely used for the protective means for lithium-ion batteries incorporated in portable appliances including cell phones and personal computers. Nonetheless, the present-day PTC element is needed to provide high tension withstanding property because the storage batteries have increasingly higher capacity. If the high tension withstanding property is critical for the PTC element, the solid matrix poses the major issue of material deterioration that comes from either the occurrence of cracks or the electric discharge blamed on such cracks and void defects in the matrix. After having studied the technical background as stated earlier, the inventors have led to a new concept of the introduction of liquid matrix that is less in occurrence of the cracks and voids than the solid matrix. It has been moreover found that the dielectrophoresis force or the gradient force working on conductive particles under a non-uniform electric field is preferably available for the capture of the conductive particles.

The present invention envisaged overcoming the problems stated earlier has as its principal object the provision of a self-recovering current limiting fuse in which a liquid matrix is adopted instead of the conventional solid matrix to render the matrix free of any crack and also improve a voltage withstanding property up to, for example over ten times higher than the solid matrix by counting on a higher dielectric strength in the liquid matrix than in gaseous medium. In particular, the present invention provides a self-recovering current limiting fuse, in which the improvement in the voltage withstanding property can ensure no electric discharging even under high voltage of 100V, achieving the protective function for the secondary batteries high in their rated voltage, and helping gain increasingly wider application in many appliances as well as shorten the required charging time. The present invention has as more particular object to provide a self-recovering current limiting fuse, which works on the basic principals of operation that the fuse has self-recovering characteristics in virtue of dielectrophoretic force to make sure of the repeated reversals between the blocking or restricting state and the conducting state, and also requires no maintenance to exchange any fuse element to new one. With the self-recovering current limiting fuse using the dielectrophoretic force according to the present invention, further, fillers of solid conductive particles are mixed in a liquid matrix in a suspended phase to lessen a contact electric-resistance, thereby getting the "on" resistance reduced.

SUMMARY OF THE INVENTION

The present invention relates to a self-recovering current limiting fuse using a dielectrophoretic force, characterized in that solid conductive particles are dispersed in a liquid matrix filling in an insulating vessel while electrodes are placed in a liquid matrix in opposition to one another to provide a PTC current-limiting element in which the conducting solid particles get clumped together between the electrodes under an influence of a dielectrophoretic force generated by an application of an electric potential across the electrodes, thereby bridging a gap across the electrodes to establish a conducting state, while the solid conductive particles get evaporated and scattered away if an excessive current flows across the electrodes, making a high-resistant condition to establish a current limiting or blocking state, thereby making repeated reversals between the conducting state and the current limiting or blocking state.

In one aspect of the present invention there is provided a self-recovering current limiting fuse in which the liquid matrix is made of a matrix composed of at least one material selected from the group consisting of deionized water including pure water, insulating oil, insulating organic polymer, and insulating organic polymer gel.

In another aspect of the present invention there is provided a self-recovering current limiting fuse in which the solid conductive particles serving as fillers are made of either at least one material with relatively low fusing point selected from the group including Sn, Zn, In, Bi and so on, or a mixture of at least one material with relatively low fusing point selected from the group including the group including Sn, Zn, In, Bi and so on, and a material of at least one material with relatively low contact resistance selected from the group including carbon particles, Cu, Al, Ag, Au and so on. As an alternative solid conductive particles, a material with relatively high fusing point selected from the group including W, Ti, stainless steel and so on is added into the material with relatively low fusing point or the mixture of the material with relatively low fusing point and the material with relatively low contact resistance, thereby keeping every solid conductive particles against evaporating and scattering all apart.

In a further another aspect of the present invention there is provided a self-recovering current limiting fuse in which the solid conductive particles are produced by either a first process of making the material into granule of a preselected size, or a second process in which a solid fusible element of a rod or plate composed of the material is first connected with the electrodes to extend across the gap between them, thereafter the excessive current flowing across the electrodes melts the solid fusible element into fuse fragments scattering apart, which in turn solidify into the solid conductive particles.

In another aspect of the present invention there is provided a self-recovering current limiting fuse in which the electrode is composed of a glass or metal board, an oxide coating built on the board, and a conductive metal of at least one selected from the group consisting of Al, Cu, Ag and Au formed on the oxide coating. But if considering the arc-proof property needed at the time of switching behavior into the current limiting or blocking state, the electrode consumption caused by repeated usage, and so on, a combination of the conductive metal and a material with relatively high fusing point including W, Ti, stainless steel, and so on is preferable to the conductive metal alone. Moreover, the conductive metal can be applied in the form of thin film on the oxide coating built on the glass or metal board. The electrodes, although preferably made in the shape of thin film in compliance with the gain size of the particles, but may be varied in thickness depending on whether more frequent repetition is demanded in switching behavior.

In another aspect of the present invention there is provided a self-recovering current limiting fuse in which the insulating vessel has a heat-emitting plate to get a generated heat disappearing so as to coping with the large capacity and/or a vibrator energized simultaneously with the application of the electric potential to cause vibration to render the contact condition among the solid conductive particles better, thereby helping reduce the "on" resistance.

In another aspect of the present invention there is provided a self-recovering fuse in which the liquid matrix renders the matrix free of any crack and void and also higher in dielectric strength to provide a high tension withstanding property enough to protect the secondary batteries of high voltage rating. In a further another aspect of the present invention there is provided a self-recovering current limiting fuse in which the repeated reversals between the conducting state and the current limiting or blocking state are carrier out by self-recovering property of the solid conductive particles under the influence of dielectrophoretic force.

ADVANTAGEOUS EFFECTS

With the self-recovering fuse constructed as stated earlier, a liquid matrix is adopted instead of the conventional solid matrix to contain the occurrence of any crack and void in the matrix and also improve a high tension withstanding property. Thus, the liquid matrix is in favor of realizing the generation of the dielectrophoretic force under the application of electric potential to act on the solid conductive particles to ensure the self-restorable characteristic. Mixing or suspending the solid conductive particles of, for example nano-carbon fillers in the liquid matrix helps render the contact resistance or the "on" resistance less to make the voltage withstanding property higher enough to protect the secondary batteries of high voltage rating. Thus, the self-recovering current limiting fuse of the present invention helps gain increasingly wider application in many appliances as well as achieve highly improved efficiency, and further shorten the required charging time with accompanying maintenance free operation. The self-recovering current limiting fuse of the present invention, moreover, can find use or application in a protector against disasters and blasts, which serves as a protective element against any mechanical shock in a way that the string of solid conductive particles joining together breaks under the influence of mechanical shocks or vibrations arising from seismic effects, collisions, and so on to switch off the current.

BRIEF DESCRIPTION OF THE DRAWINGS

In the accompanying drawings, a code of same numbers and letters throughout the views refers to a like part or component recited later.

1 self-recovering current limiting fuse
2 liquid matrix
3 solid conductive particle
4, 4A, 4B, 4C and 4D electrode
9 insulating vessel
10 electric source
11 microscope
12 digital video camera
13 needle electrode
14 planar electrode
15, 19 rod electrode
16, 20 recessed electrode
17, 18 teeth

BEST MODE FOR CARRYING OUT THE INVENTION

Figure 1:
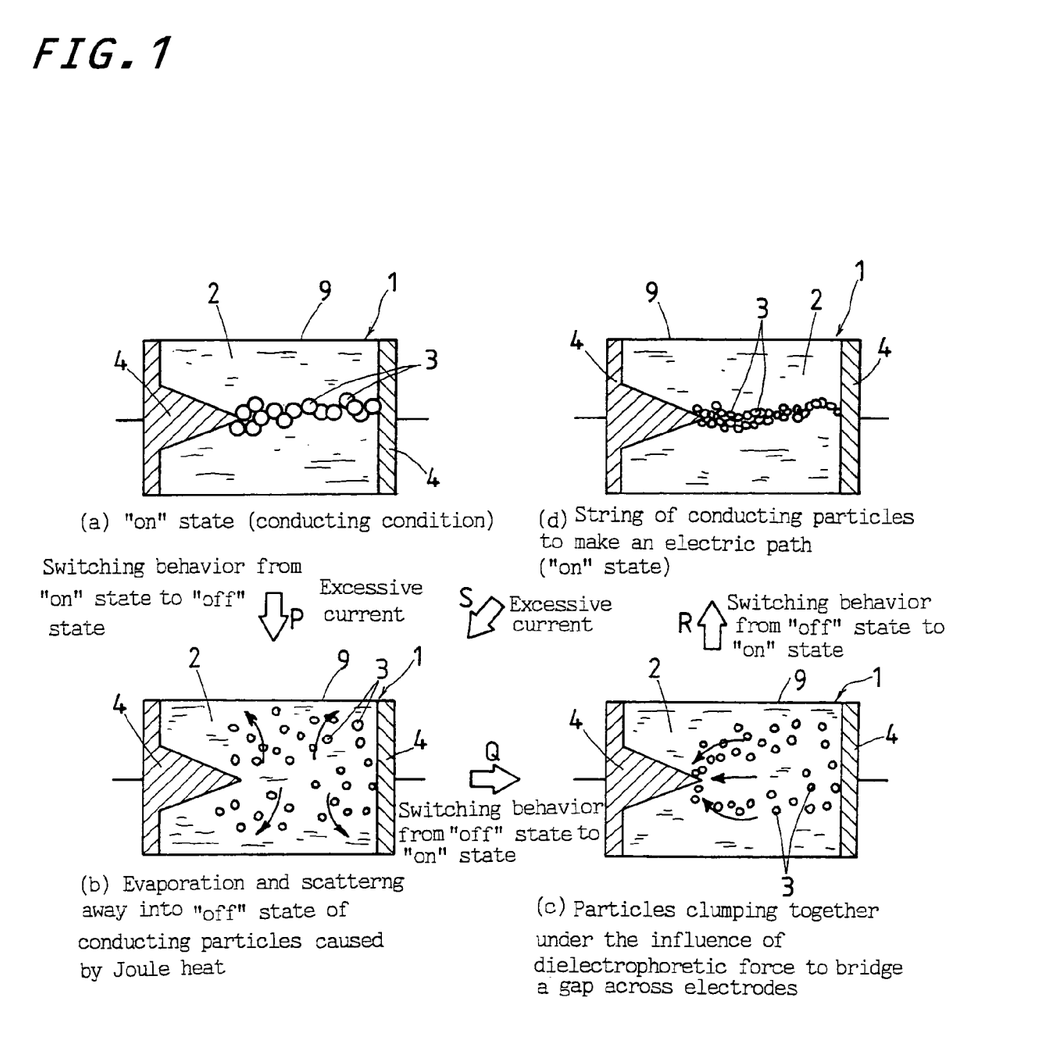
FIG. 1 is a schematic view of a self-recovering current limiting fuse according to the present invention to illustrate basic principals of operation of the self-recovering current limiting fuse in which solid conductive particles are under the influence of dielectrophoretic force.
Figure 2:
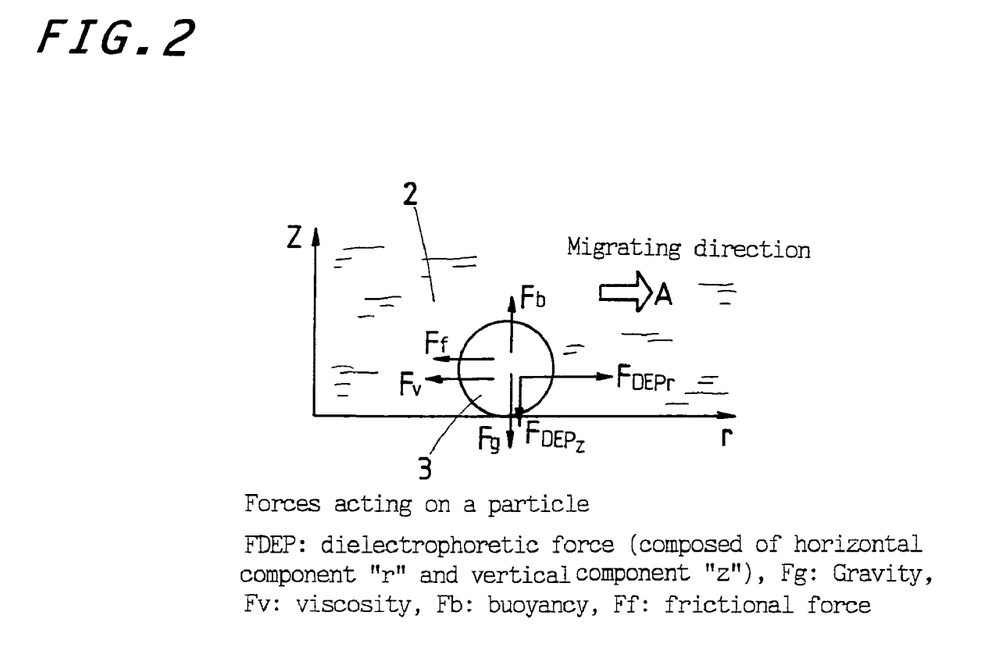
FIG. 2 is an illustration explanatory of the basic principals of operation of how a dielectrophoretic force exerts on a conducting solid particle suspended in a liquid matrix in the self-recovering current limiting fuse according to the present invention.

A self-recovering current limiting fuse according to the present invention is constructed in a way that solid conductive particles existing as dispersions in a matrix applied with an electric potential across electrodes make come into mutual connection under the influence of dielectrophoretic force to establish a continuous conductive path. Although the matrix is preferably a liquid matrix under the usual influence of gravity, it will be appreciated that vacuum is also allowed as the matrix in a weightless, or zero gravity, environment in, for example spacecrafts. Referring now in detail to the drawings, the self-recovering current limiting fuse according to the present invention will be explained below with reference to the version operating ordinarily on Earth. In FIG. 1, there is shown a version of the self-recovering current-limiting fuse according to the present invention to explain the basic principals of operation of a dielectrophoretic force exerted on solid conductive particles 3 dispersed in a liquid matrix 2 if a preselected electric potential is applied across opposing electrodes 4. With the self-recovering current limiting fuse 1 of the present invention, the liquid matrix 2 is selected instead of the solid matrix and held inside an insulating vessel 9. The liquid matrix 2 is further flanked by electrodes 4 while solid conductive particles 3 are dispersed in the liquid matrix 2 to form a suspension system. The self-recovering current limiting fuse 1 constructed as stated earlier, if the electric potential of an electric power fed from an electric source 10 is applied across the electrodes 4, creates a dielectrophoretic force (FDEP) exerted on the solid conductive particles 3 dispersed in the liquid matrix 2. Referring to FIG. 2, there is illustrated in detail the dielectrophoretic force (FDEP) exerted on the solid conductive particle 3 dispersed in the liquid matrix 2. In the 'on' state where the electric potential is applied across the electrodes 4, the solid conductive particle 3 experiences the dielectrophoretic force (FDEP) composed of a horizontal component (FDEPr) and a vertical component (FDEPz). Thus, the solid conductive particle 3 is under the resultant influence of gravity (Fg), viscosity force (Fb) and frictional force (Ff), so that the dielectrophoretic force (EDEP) acts on the solid conductive particle 3, which is in turn forced to move in a direction (A).

Figure 3:
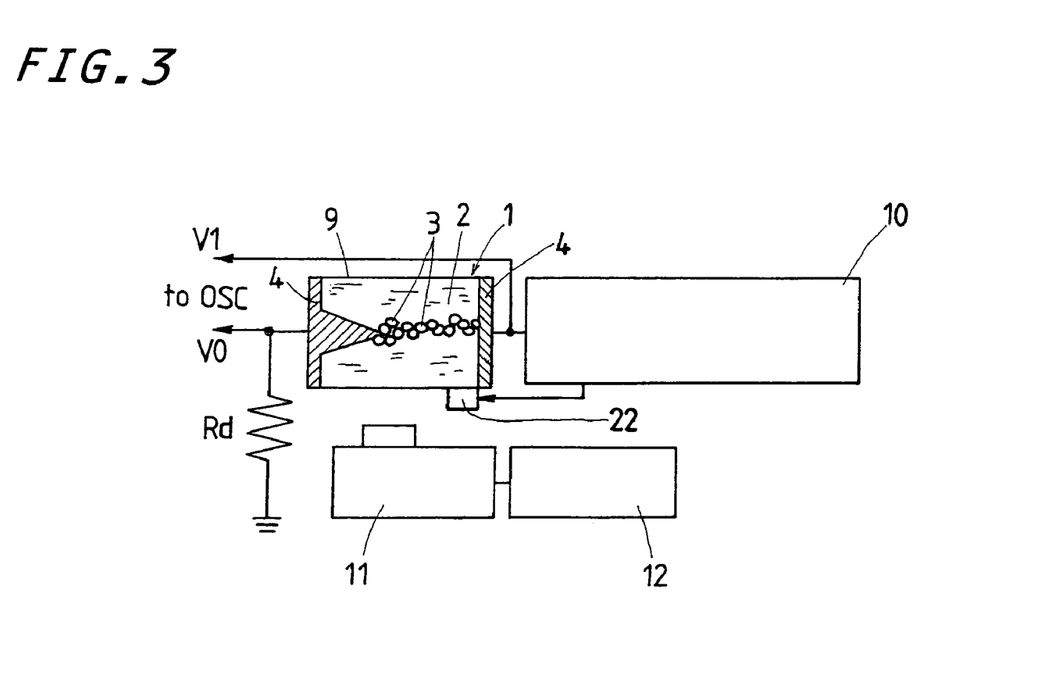
FIG. 3 is an illustration explanatory of the basic principals of how an electric potential is applied across electrodes in the self-recovering current limiting fuse according to the present invention.

With the self-recovering current limiting fuse 1 using the dielectrophoretic force (FDEP) as stated earlier, if the electric potential fed from the electric source 10 is applied across the opposing electrodes 4, the dielectrophoretic force (FDEP) effects on the solid conductive particle 3 dispersed in the liquid matrix 2. Migrating behavior of the solid conductive particle 3 under the influence of the dielectrophoretic force (EDEP) as shown in FIG. 3 can be observed on a digital video camera 12 through a microscope 11. After observation of the migrating behavior of the solid conductive particle 3 through the microscope 11, it was revealed that the solid conductive particles 3 clumped together to come into a string of particles in the liquid matrix 2 as shown in FIGS. 1(a) and 1(d) to make sure of a conducting state to let electricity pass through. In contrast, when an excessive current flowed across the electrodes 4, Joule heating generated in the liquid matrix 2 got the solid conductive particles 3 evaporating into dispersion as shown in FIG. 1(b), thereby making a current limiting or blocking state. With the self-recovering current limiting fuse 1 relied on the dielectrophoretic force (EDEP), the conducting solid particles 3 hanging in the liquid matrix 2 are clumped together instead of dispersing and caught between the electrodes 4 into a chain wire of the solid conductive particles 3 as shown in FIG. 1(c) in the ordinary conducting state. Eventually, the solid conductive particles 3 as shown in FIG. 1(d) resemble somewhat a string of pearls and form a conductive path, making the conducting "on" state. As an alternative, a substrate on which the conductive path is built may be made thereon with a groove to make collection of the particles much easier, getting the solid conductive particles 3 converging more effectively between the electrodes 4. The substrate may be made to have not only the secondary structure of planar shape, but also the tertiary structure of solid shape having any groove to make it easier to catch the particles. Moreover, if the self-recovering current limiting fuse 1 is needed to better prepare for larger capacity than ever expected, the substrate may be made to have, for example radiating fins to render heat disappearance easier. Alternatively, the self-recovering current limiting fuse 1 may be encapsulated with any enclosure to protect the element against breakage that might take place owing to, for example thermal expansion at the "off" state.

By the principals of operation of the self-recovering current limiting fuse 1 of the present invention, when the electric potential fed out of the electric source 10 shown in FIG. 3 is applied across the electrodes 4, the solid conductive particles 3 dispersed in the liquid matrix 2 migrate under the influence of the dielectrophoretic force (FDEP) to clump together between the electrodes 4, forming the conducting wire bridging a gap between the electrodes 4 to provide the conducting "on" state as shown in FIG. 1(a). Unlike the phase as stated earlier, if the excessive current flows into the self-recovering current limiting fuse 1 in which the solid conductive particles 3 are kept in bridging the gap between the electrodes 4, Joule heating generated at junction points and contact surfaces of adjacent particles 3 triggers off a phase change from the "on" condition to the "off" condition as shown in relation to an arrow (P). More particularly, the solid conductive particles 3 get melting and further evaporating, inclusively in part the liquid matrix 2, to fall apart in the liquid matrix 2 as shown in FIG. 1(b), thereby getting the current flowing through the self-recovering current limiting fuse 1 very little or blocked. There, when the excessive current becomes lost in the self-recovering current limiting fuse 1, a reverse phase change from the "off" condition to the "on" condition as shown in relation to an arrow (Q) occurs again and, therefore, the solid conductive particles 3 in the liquid matrix 2 as shown in FIG. 1(c) start to come together in the gap between the electrodes 4. Thus, the phase change from the "off" condition to the "on" condition takes place in relation to an arrow (R). Eventually, the solid conductive particles 3 falling apart in the liquid matrix 2 clump together to restore the conductive path like the string of pearls between the electrodes 4 as shown in FIG. 1(d), thereby making the conducting "on" state. Thereafter, if the excessive current flows again into the self-recovering current limiting fuse 1 that the solid conductive particles 3 as shown in FIG. 1(d) are in bridging the gap between the electrodes 4, the phase change from the "on" condition to the "off" condition in FIG. 1(b) takes place in relation to an arrow (S). Thus, the self-recovering current limiting fuse 1 makes sure of the repeated reversals between different conditions as recited earlier to have come to play the function required to the self-recovering current limiting fuse 1.

The self-recovering current limiting fuse 1 of the present invention was made based on the unique conception of performing the repeated reversals between the conducting state and the current limiting or blocking state under the influence of the dielectrophoretic force as recited earlier. The self-recovering current limiting fuse 1 constructed as stated earlier can, in principle, control the switching behavior between the conducting state and the current limiting or blocking state, depending on selection of operating factors including on/off resistance, current limiting capacity, operating time, grain size of the solid conductive particles, and so on. The self-recovering current limiting fuse 1 of the present invention, moreover, can find use or application in a protector against disasters and blasts, which serves as a protective element against any mechanical shock in a way that the string of solid conductive particles 3 joining together breaks under the influence of mechanical shocks or vibrations arising from seismic effects, collisions, and so on to switch off the current. Adjustment of the response time for restoration from the "off" state to the "on" state in the self-recovering current limiting fuse 1, depending on the application, can be carried out by selection of the liquid matrix 2 different in viscosity, control of the distance of the gap across the electrodes 4 as well as determination of the electric field intensity relied on both the distance of the gap across the electrodes 4 and the shape of the electrodes 4.

With the self-recovering current limiting fuse 1 of the present invention, as shown in FIG. 1, the solid conductive particles 3 dispersed in the liquid matrix 2 get effectively converged under the influence of the dielectrophoretic force to join together, bridging the gap across the electrodes 4 to establish the conducting state as shown in FIGS. 1(*a*) and 1(*d*). Contrary to the above, the excessive current gets the solid conductive particles 3 evaporating and scattering as shown in FIG. 1(*b*) to render the electric resistance elevated, resulting in exhibiting the current limiting or blocking state. Any gel may be considered for the matrix instead of the liquid matrix 2. Advantages of using gel for the self-recovering current limiting fuse are thought to prevent the solid conductive particles 3 from scattering very far as in the liquid matrix 2, thereby rendering the clumping efficiency of the solid conductive particles 3 worsened, and also to get out of issues of any liquid leakage that might be encountered in practical use. Most significance of usage of the liquid matrix 2 in the self-recovering current limiting fuse is to get rid of the occurrence of cracks and the discharge in voids in switching behavior into the current limiting or blocking state, which can lead to any problem causing the quality degradation in the existing solid PTC elements. Thus, the liquid matrix can yield high performance and high capacity on the self-recovering current limiting fuse.

With the self-recovering current limiting fuse 1 of the present invention, especially, the solid conductive particles 3 are scattered or dispersed to make a suspension system in the liquid matrix 2 filled in an insulating vessel 9 while the electrodes 4 are disposed in opposition to one another. The self-recovering current limiting fuse 1 of the present invent features that the electric potential applied across the electrodes 4 develops the dielectrophoretic force on the solid conductive particles 3 to collect the solid conductive particles 3 under the influence of the dielectrophoretic force in a way bridging the gap between the electrodes 4 to make the conducting state and further the excessive current flowing across the electrodes 4 gets the solid conductive particles 3 evaporating and scattering to render the electric resistance elevated, resulting in exhibiting the current limiting or blocking state. Thus, the self-recovering current limiting fuse 1 of the present invent has self-recovering characteristics in virtue of dielectrophoretic force to make sure of the repeated reversals between the blocking or restricting state and the conducting state.

The liquid matrix 2 may be made of a matrix composed of at least one material selected from the group consisting of deionized water including pure water, insulating oil, insulating organic polymer, and insulating organic polymer gel. Moreover, the liquid matrix 2 can be kept lower in its "on" resistance by cooling metals for the particles and the electrodes with refrigerants including liquid nitrogen, and so on. As an alternative, a vibrator 22 may be installed to, for example, the insulating vessel 9 of the self-recovering current limiting fuse 1 to keep the liquid matrix 2 lower in its "on" resistance. The vibrator 22 is energized simultaneously with the application of the electric potential across the electrodes 4 to cause the liquid matrix 2 to vibrate, lowering the "on" resistance. The self-recovering current limiting fuse 1, when sensing any variation in resistance on the basis of the switching behavior from the "off" state to the "on" state, causes the liquid matrix 2 to vibrate for a matter of from some milliseconds to some seconds, rendering the contact condition among the solid conductive particles 3 better to reduce the "on" resistance.

The solid conductive particles 3 serving as fillers may be made of a first material of at least one material with relatively low fusing point selected from the group including tin (Sn) particles, zinc (Zn) particles, indium (In) particles, bismuth (Bi) and so on. Alternatively, the solid conductive particles 3 may be composed of a first material of at least one material with relatively low fusing point selected from the group including tin (Sn) particles, zinc (Zn) particles, indium (In) particles, bismuth (Bi) and so on, and a second material of at least one material with relatively low contact resistance selected from the group including carbon particles, copper (Cu) particles, aluminum (Al) particles, silver (Ag) particles, gold (Au) and so on. As further another alternative, it may be conceived to add a material with relatively high fusing point selected from the group including tungsten (W), titanium (Ti), stainless steel and so on into the material with relatively low fusing point and/or the material with relatively low contact resistance for the purpose of preventing every solid conductive particles 3 from evaporating and scattering all apart to ensure the repeated reversals in switching behavior. Thus, any wire-fuse element to provide the solid conductive particles 3 may be made of a mixture or alloy of the material with relatively low fusing point and/or the material with relatively low contact resistance and the material with relatively high fusing point.

Production of the solid conductive particles 3 for the self-recovering current limiting fuse of the present invention may starts with either of a wire fuse and a granulated fuse. That is, the solid conductive particles 3 are produced by making the first and/or second materials into granule of a preselected size. As an alternative, the solid conductive particles 3 may be fabricated through processes as stated later. A solid fusible element, not shown, of a rod or plate composed of the first and/or second is first connected with the electrodes 4 to extend across the gap between them. If turning on the excessive current between the electrodes 4, the solid fusible element melts into fuse fragments scattering apart in the liquid matrix 2. The fuse fragments in turn solidify into the solid conductive particles 3. In production of the suspension system in which the solid conductive particles 3 are dispersed in the liquid matrix 2, in particular, the solid fusible element is first set to make the conducting state between the electrodes 4. The excessive current applied across the electrodes 4 causes the solid fusible element to melt into fuse fragments evaporating and scattering apart in the liquid matrix 2, thereby making the current limiting or blocking state in which all the fuse fragments falling apart in the liquid matrix 2 solidify into the solid conductive particles 3. When the excessive current become lost between the electrodes 4 and the preselected electric potential is applied the electrodes 4, the solid conductive particles 3 start clumping together to bridge between the electrodes 4, making the conducting state. On starting with a wire fuse, it will be preferred to initially disperse an adequate amount of particles to make the "on" resistance better at the time of returning again the "on" state after once in "off" state.

With the self-recovering current limiting fuse of the present invention, adoption of the liquid matrix 2 renders the matrix free of any crack and void to contribute to getting the voltage withstanding property higher to make it easier to protect the secondary batteries having the high voltage rating.

Moreover, the repeated switching behaviors into the current limiting or blocking state are carried out because of the self-recovering characteristic relied on the dielectrophoretic force acting the solid conductive particles 3.

Figure 4:
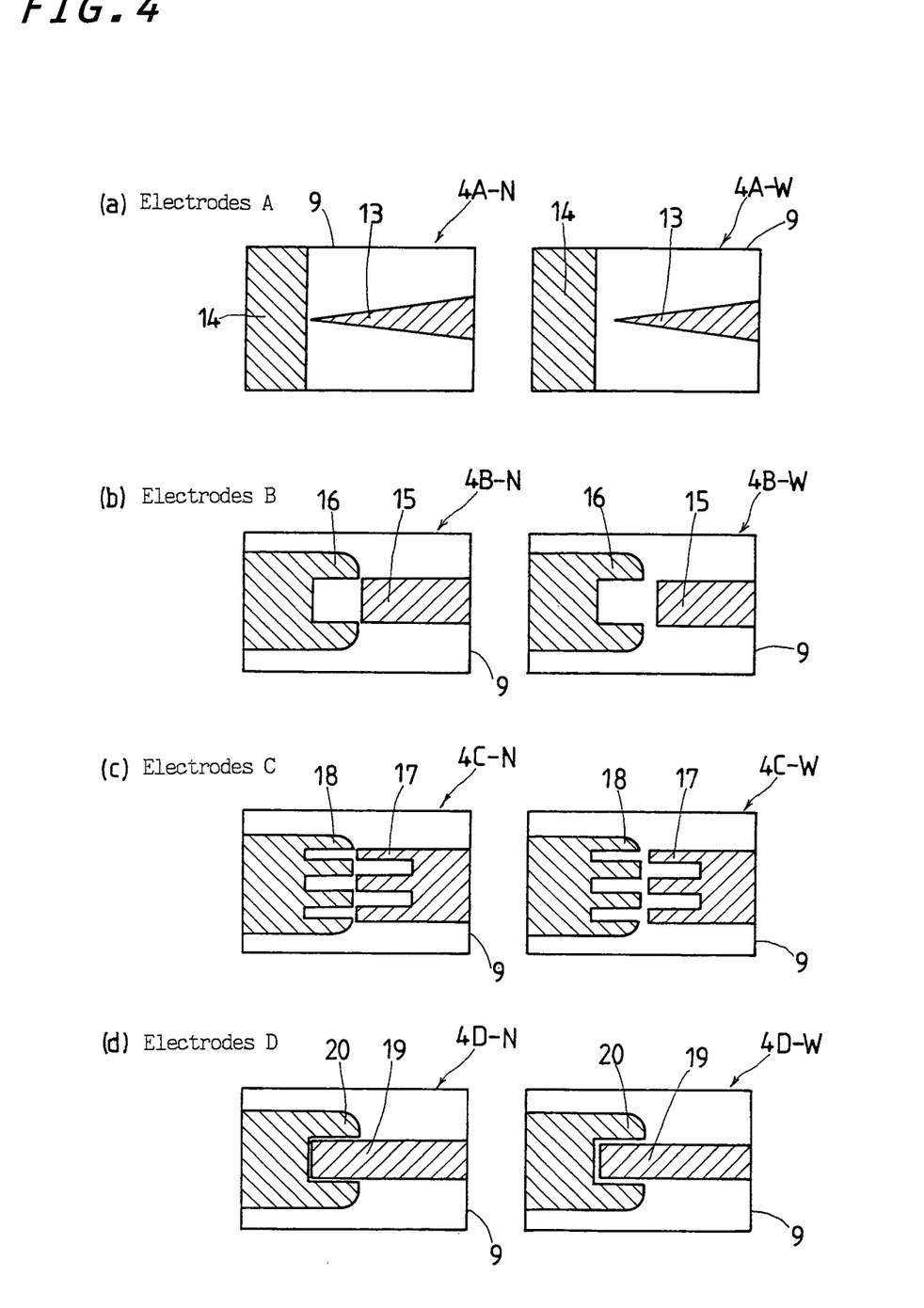
FIG. 4 is a plan view showing some versions of the electrode made for the self-recovering current-limiting fuse according to the present invention.

Various material may be selected for the electrodes 4. Shape of the electrodes 4 may be also determined in light of performance to clump together the solid conductive particles 3, pattern of conductive path and electric insulation in the "off" state. The electrodes 4 are composed of a glass or metal board, an oxide coating built on the board, and a thin film of a conductive metal formed on the oxide coating, the conductive metal for the thin film being at least one selected from the group consisting of Al, Cu, Ag and Au. Moreover, any material with relatively high fusing point including W, Ti, stainless steel and so on may be availed or added to make the repeated reversals in switching behavior easier. The electrodes 4 haven't to be necessarily limited to the thin film, but may be made into any other shape adapted to create the non-uniform electric field to make it easier to come into contact with the particles, or rather hard to rise in contact resistance. For example, the electrodes 4 have only to be made into such shape that allows the contact resistance rising gradually in a slantwise or stepwise manner. The electrodes 4 is preferably produced by a material high in arc-proof property as well as resistant against electrolytic corrosion, and the material is made of either a material with relatively high fusing point alone or an alloy including material with high fusing point. Four versions of the electrodes 4 are shown in FIG. 4. A first electrode set 4A in FIG. 4(a) is composed of a needle electrode 13 and a planar electrode 14 lying in opposition to one another. A second electrode set 4B in FIG. 4(b) is composed of a rod electrode 15 and a recessed electrode 16 complementary to and in opposition to each other. FIG. 4(c) illustrates a third electrode set 4C composed of an electrode with teeth 17, and another electrode with teeth 18 larger in number than the teeth 17 and lying in opposition to the teeth 17. An electrode set 4D in FIG. 4(d) is composed of a rod electrode 19 and another electrode lying in opposition to the electrode 19 and having a recess 20 to fit over the rod electrode 19. In electrode arrangements 4A-N, 4B-N, 4C-N and 4D-N at left in FIG. 4, there are shown the electrodes 4 opposing across a gap less in gap length, for example a gap of 30 μm. In contrast, the gap length in electrode arrangements 4A-W, 4B-W, 4C-W and 4D-W at right in FIG. 4 have the electrodes 4 are spaced away from one another across the gap length larger, which is for example a matter of 150 μm.

Figure 5:
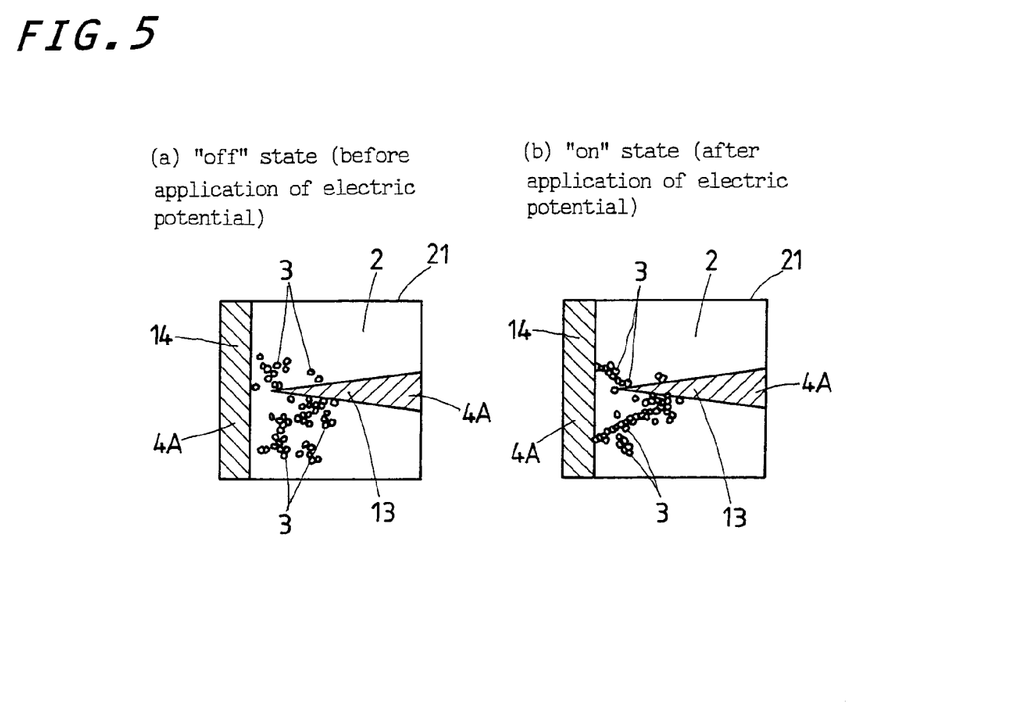
FIG. 5 is an illustration explanatory of a state where an electric potential is applied across a needle electrode and a planar electrodes.

Referring now to FIG. 5, there is shown the migration of the solid conductive particles 3 in the liquid matrix 2 filled in the insulating vessel 21 under the influence of the electric field applied across the electrode set 4A in FIG. 4. First in FIG. 5(a), the solid conductive particles 3 are suspended in the matrix 2 in a way scattering away to take on the "off" state because there is no electric field across the electrode set 4A. After the electric field of the electric source 10 has been applied across the electrode set 4A, the solid conductive particles 3 migrate in the liquid matrix 2 to clump together into a string of particles as shown in FIG. 5(b) to make the conducting "on" state.

Figure 6:
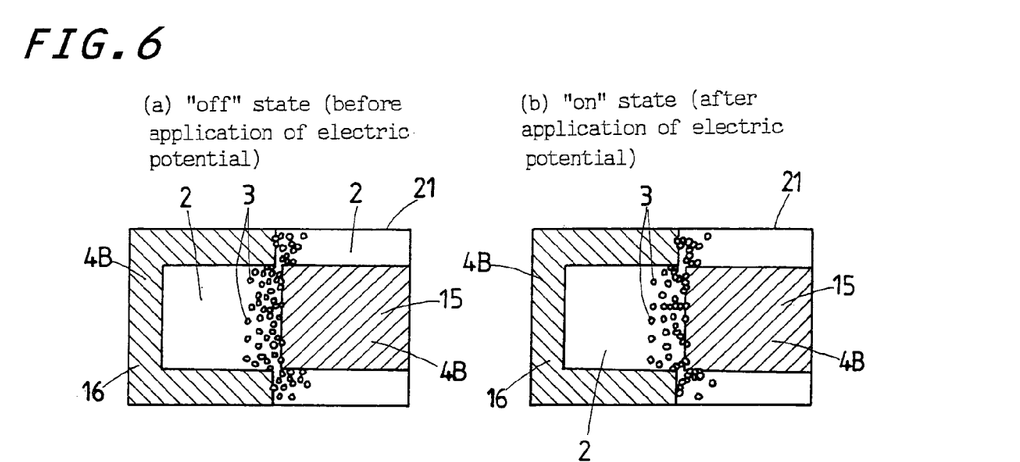
FIG. 6 is an illustration explanatory of a state where an electric potential is applied across a rod electrode and a recessed electrodes.

Further referring now to FIG. 6, there is shown the migration of the solid conductive particles 3 in the liquid matrix 2 filled in the insulating vessel 21 under the influence of the electric field applied across the second electrode set 4B in FIG. 4. First in FIG. 6(a), the solid conductive particles 3 are suspended in the matrix 2 in a way scattering away to take on the "off" state because there is no electric field across the electrode set 4B. After the electric field of the electric source 10 has been applied across the electrode set 4B, the solid conductive particles 3 migrate in the liquid matrix 2 to clump together into a string of particles as shown in FIG. 6(b) to make the conducting "on" state.

Figure 7:
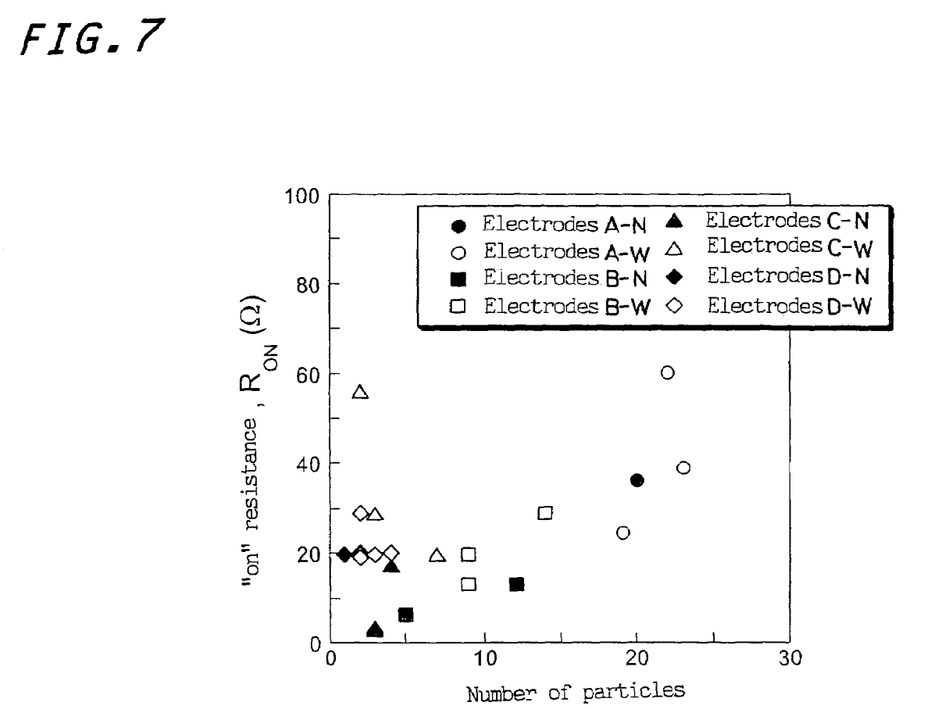
FIG. 7 is a graphic representation showing relations between a number of solid conductive particles and an "on" resistance on short-circuiting across the electrodes in accordance with different versions of the electrodes.

In FIG. 7, there is shown a graphic representation to study the relation of the numbers of solid conductive particles 3 vs. the "on" resistance to short-circuit across the electrodes 4 with respect to every electrode set 4A-N, 4B-N, 4C-N, 4D-N, 4A-W, 4B-W, 4C-W and 4D-W.

It will be understood from FIG. 7 that the relations of the numbers of solid conductive particles 3 with the "on" resistance are difference depending on the shape the electrodes 4 and the gap length across the electrodes 4. Among the electrode arrangements, the electrode set 4C-N will be found realizing the least "on" resistance. With the electrode sets 4A and 4B, it will turn out that more solid conductive particles 3 are needed to accomplish the "on" state and the gaps between the electrodes 4 are made larger. Moreover, the graphic representation tells the "on" resistance grows as the numbers of the solid conductive particles 3 increases, thereby getting the contact resistance rising. In contrast, the electrode sets 4C and 4D are found enabling to realize the "on" state with less numbers of the solid conductive particles 3. It will be further understood that the contact condition among the solid conductive particles 3 can vary from the electrode set to other and also the contact electric-resistance is not necessarily governed by only the numbers of the particles because there is not that much difference between the electrode sets 4C and 4D while the solid conductive particles 3 are not uniform in grain size and grain shape.

Figure 8:
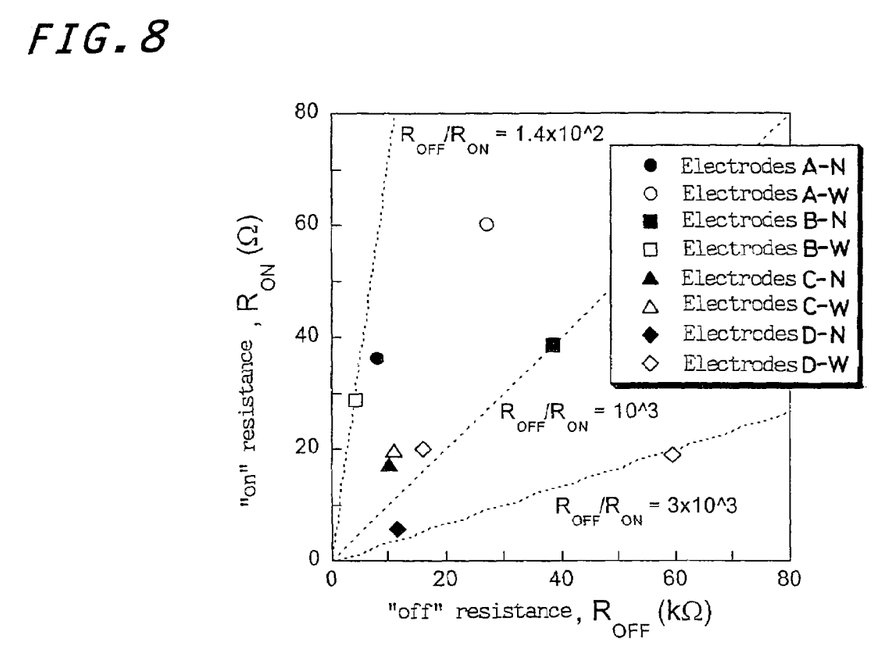
FIG. 8 is a graphic representation showing relations between an "off" resistance and an "on" resistance in accordance with different versions of the electrodes.

Referring next to FIG. 8, there is shown a graph to study the relation of the "off" resistance vs. the "on" resistance with respect to every electrode set 4A-N, 4B-N, 4C-N, 4D-N, 4A-W, 4B-W, 4C-W and 4D-W.

As known from FIG. 8, there are large differences in the relation between the "on" resistance and the "off" resistance, depending on the shape of the electrode 4 as well as the gap length across the electrodes 4. In FIG. 8, a ratio (ROFF/RON) between the "on" resistance and the "off" resistance is depicted by a dotted line. It is better if the ratio (ROFF/RON) grows high. The ratio (ROFF/RON) turns out plotted in the range of from 140 times to 3000 times. Of the different electrode sets shown in FIG. 8, the electrode set 4D-N turns out to exhibit the best variation of 3000 times in resistance. With the electrode 4 recited earlier, even though the electrode board is less in resistance, the "off" resistance of the electrode 4 is restricted depending on the resistance of the electrode board. Adoption of the board higher in resistance is thus thought to further increase the "off" resistance of the electrode board a ten to hundred times. On the other hand, the "on" resistance can be considered to be further lowered by the addition of carbon nano-fillers to decrease the contact electric-resistance. With these the "off" resistance may reach the order of from 100 kΩ to some MΩ while the "on" resistance is kept at the order of mΩ. Thus, the ratio of resistance variation results in increasing a $10^8$ to $10^9$ times.

INDUSTRIAL APPLICABILITY

The self-recovering current limiting fuse using the dielectrophoretic force according to the present invention may well serve the protective element for the secondary batteries of high tension and high capacity, which find their way into, for example, recent electronic gadgets including cell phones, lap-top personal computers and so on, automotive electrical and electronic equipment, hybrid cars, and so on.

The invention claimed is:

1. A self-recovering current limiting fuse using a dielectrophoretic force, said fuse comprising solid conductive particles dispersed in a liquid matrix filling in an insulating vessel; and electrodes placed in the liquid matrix in opposition to one another to provide a positive temperature coefficient (PTC) current limiting element in which the solid conductive particles get clumped together between the electrodes under an influence of the dielectrophoretic force generated by an application of an electric potential across the electrodes, thereby bridging a gap across the electrodes to establish a conducting state, while the solid conductive particles get evaporated and scattered away if an excessive current flows across the electrodes, making a high-resistant condition to establish a current limiting or blocking state, thereby making repeated reversals between the conducting state and the current limiting or blocking state possible,
wherein:
the liquid matrix is made of a matrix composed of at least one material selected from the group consisting of deionized water including pure water, and liquid insulating oil, while the solid conductive particles are permitted in the matrix to migrate freely between getting clumped together and coming apart from each other.

2. A self-recovering current limiting fuse defined by claim 1, wherein the solid conductive particles serving as fillers are made of either at least one material with a relatively low fusing point selected from the group consisting of Sn, Zn, In, and Bi, or a mixture of at least one material with a relatively low fusing point selected from the group consisting of Sn, Zn, In, and Bi, and at least one material with a relatively low contact resistance selected from the group consisting of Cu, Al, Ag, and Au.

3. A self-recovering current limiting fuse defined by claim 2, wherein a material with a relatively high fusing point selected from the group consisting of W, Ti, and stainless steel is added into the material with the relatively low fusing point or the mixture of the material with the relatively low fusing point and the material with relatively low contact resistance.

4. A self-recovering current limiting fuse defined by claim 1, wherein the electrodes are composed of a glass or metal board, an oxide coating built on the board, and at least one conductive metal selected from the group consisting of Al, Cu, Ag and Au or a combination of the conductive metal and a material with a relatively high fusing point selected from the group consisting of W, Ti, and stainless steel formed on the oxide coating.

* * * * *